United States Patent
Kozaki

(10) Patent No.: US 11,378,073 B2
(45) Date of Patent: Jul. 5, 2022

(54) ESTIMATION DEVICE AND VALVE CONTROL DEVICE

(71) Applicant: SHIMADZU CORPORATION, Kyoto (JP)

(72) Inventor: Junichiro Kozaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 583 days.

(21) Appl. No.: 16/544,015

(22) Filed: Aug. 19, 2019

(65) Prior Publication Data

US 2020/0109706 A1 Apr. 9, 2020

(30) Foreign Application Priority Data

Oct. 5, 2018 (JP) .............................. JP2018-190225

(51) Int. Cl.
*F04B 49/06* (2006.01)
*F16K 27/04* (2006.01)
*F04B 49/08* (2006.01)
*F04B 37/14* (2006.01)
*F16K 37/00* (2006.01)
*F04B 51/00* (2006.01)
*G05B 23/02* (2006.01)

(52) U.S. Cl.
CPC ............ *F04B 49/065* (2013.01); *F04B 37/14* (2013.01); *F04B 49/08* (2013.01); *F04B 51/00* (2013.01); *F16K 27/04* (2013.01); *F16K 37/0041* (2013.01); *G05B 23/0283* (2013.01); *F04B 2205/13* (2013.01)

(58) Field of Classification Search
CPC ........ F04B 51/00; F04B 49/065; F04B 37/14; F04B 49/08; G05B 23/0283; F16K 27/04; F16K 37/0041; F16K 37/0083; G05D 7/0635

See application file for complete search history.

(56) References Cited

U.S. PATENT DOCUMENTS

| 5,439,355 A | * | 8/1995 | Jimison | ............ A61M 5/16854 417/63 |
| 10,437,265 B2 | * | 10/2019 | Pyötsiä | ................. F16K 37/005 |
| 2004/0167738 A1 | * | 8/2004 | Miller | ..................... F04B 51/00 702/114 |

FOREIGN PATENT DOCUMENTS

| JP | 2014093497 A | 5/2014 |
| JP | 2018106718 A | 7/2018 |

* cited by examiner

*Primary Examiner* — Atif H Chaudry
(74) *Attorney, Agent, or Firm* — Renner, Otto, Boisselle & Sklar, LLP

(57) ABSTRACT

An estimation device comprises: an oscillation section configured to superimpose an oscillation signal for oscillating a valve body of a vacuum valve provided between a vacuum pump configured to pump gas from a chamber and the chamber on an opening degree signal for driving the valve body; and an estimation section configured to estimate, based on a pressure response of a chamber internal pressure upon oscillation, a pumping characteristic regarding the gas pumped through the vacuum valve.

6 Claims, 11 Drawing Sheets

US 11,378,073 B2

ESTIMATION DEVICE AND VALVE CONTROL DEVICE

BACKGROUND OF THE INVENTION

1. Technical Field

The present invention relates to an estimation device and a valve control device.

2. Background Art

In a semiconductor process such as dry etching, the process is performed in a state in which process gas flows into a chamber while a chamber internal pressure is maintained at a predetermined pressure. For the process gas injected into the chamber, process conditions such as a mixture ratio of multiple gas types and a flow rate Q are set in advance. The process gas is adjusted by a flow rate controller to satisfy these conditions. Moreover, a chamber pressure is also one of important process conditions. Generally, an automatic pressure adjustment valve (also called an "APC valve") for pressure adjustment is provided between a chamber and a vacuum pump (see, e.g., Patent Literature 1 (JP-A-2014-093497)). The chamber pressure is measured by a vacuum meter, and a valve body opening degree position of the valve is controlled such that the chamber pressure reaches a preset predetermined pressure value. In this manner, the chamber pressure is held at the predetermined pressure value. In the APC valve, data on pumping characteristics of a vacuum pumping device is stored in advance, and pressure adjustment operation is performed based on the pumping characteristics data.

However, the pre-stored pumping characteristic data is generally based on standard gas (e.g., nitrogen gas or argon gas) different from process gas to be actually used. Pumping characteristics of a pumping system including the APC valve and the vacuum pump also depend on a gas type. Thus, when the gas type of the pumping characteristic data and the process gas are different from each other, there is a problem that the accuracy of pressure adjustment is lowered.

SUMMARY OF THE INVENTION

An estimation device comprises: an oscillation section configured to superimpose an oscillation signal for oscillating a valve body of a vacuum valve provided between a vacuum pump configured to pump gas from a chamber and the chamber on an opening degree signal for driving the valve body; and an estimation section configured to estimate, based on a pressure response of a chamber internal pressure upon oscillation, a pumping characteristic regarding the gas pumped through the vacuum valve.

The estimation device estimates, based on an oscillation amplitude of the oscillation signal, the pressure response, and a plant gain indicating a relationship between a change in an opening degree of the valve body and a change in the chamber internal pressure, an effective pumping speed regarding the gas pumped through the vacuum valve.

The oscillation section sets the oscillation amplitude such that a product of a plant gain indicating a relationship between a change in an opening degree of the valve body and a change in the chamber internal pressure and an oscillation amplitude of the oscillation signal is constant.

The pumping characteristic is the effective pumping speed regarding the gas pumped through the vacuum valve, and in a case where a volume of the chamber is V and an effective pumping speed at an upper opening degree limit of an estimated opening degree range for the effective pumping speed is Semax, the oscillation section sets an angular frequency ω of the oscillation signal to ω>Semax/V.

A valve control device comprises: a pressure adjustment section configured to generate an opening degree signal of a valve body of a vacuum valve. The pressure adjustment section generates the opening degree signal based on the pumping characteristic estimated by the estimation device.

A valve control device comprises: a storage section configured to store an effective pumping speed regarding gas pumped through a vacuum valve attached to a chamber and a chamber volume; a pressure adjustment section configured to generate an opening degree signal of a valve body of the vacuum valve based on the effective pumping speed and the chamber volume stored in the storage section; a calibration section configured to calibrate the effective pumping speed and the chamber volume stored in the storage section based on a chamber internal pressure in a case where the vacuum valve attached to the chamber into which a predetermined molecular weight and a predetermined flow rate of gas is injected is controlled to multiple opening degrees; and a determination section configured to determine, based on the pumping characteristic estimated by the estimation device, whether or not a molecular weight and a flow rate of the gas are coincident with the predetermined molecular weight and the predetermined flow rate.

According to the present invention, stability in a pressure adjustment response upon pressure adjustment by a vacuum valve can be improved.

DETAILED DESCRIPTION OF THE EXEMPLARY EMBODIMENTS

Figure 1:
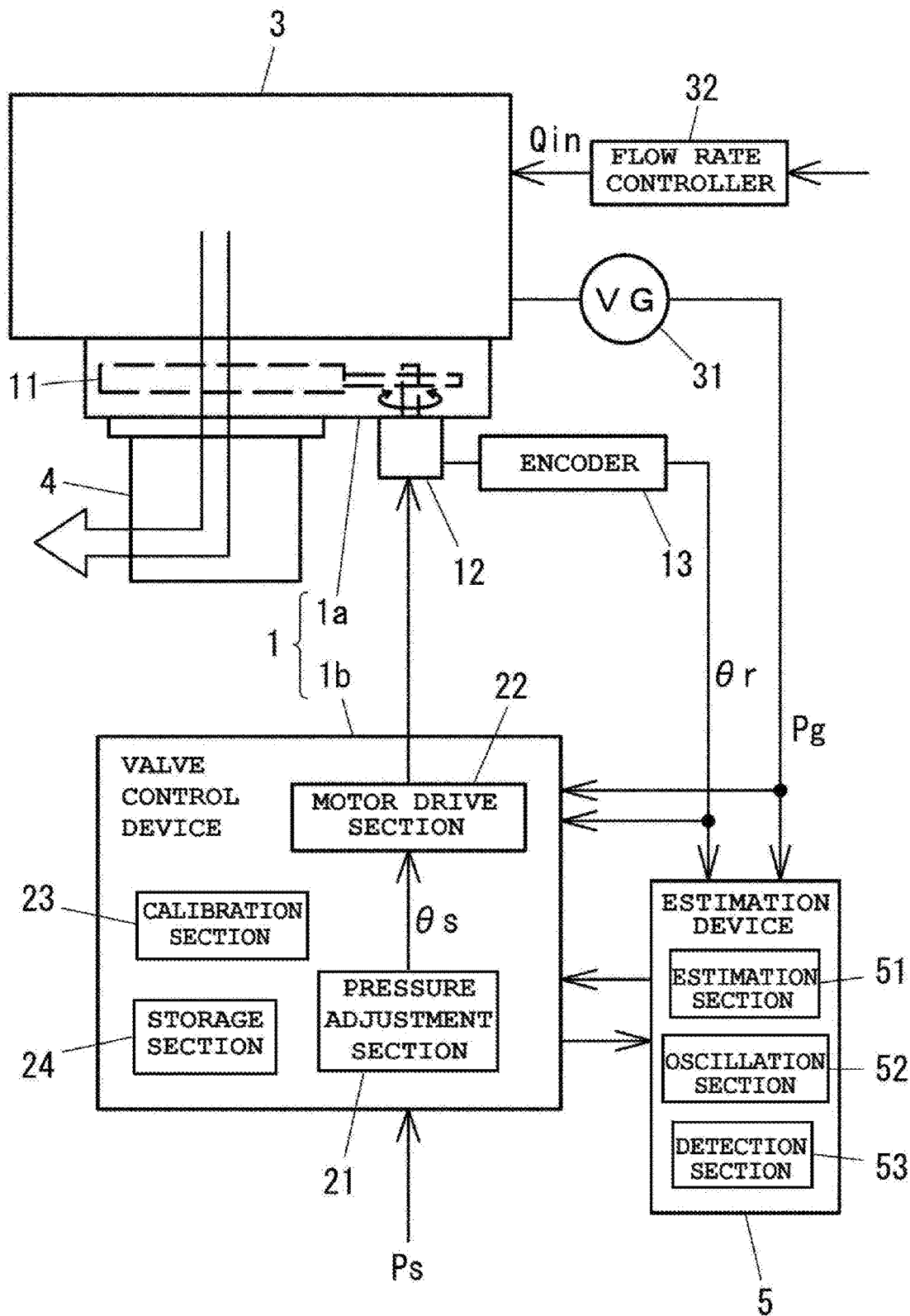
FIG. 1 is a block diagram of an outline configuration of a vacuum system including an automatic pressure control valve.

Hereinafter, an embodiment of the present invention will be described with reference to the drawings. FIG. 1 is a block diagram of an outline configuration of a vacuum system including an automatic pressure control valve (hereinafter referred to as an "APC valve"). The APC valve 1 includes a valve main body 1a attached to a chamber 3, and a valve control device 1b configured to drivably control the valve main body 1a. The chamber 3 in which various reaction processes are performed is vacuum-pumped by a pumping system including the valve main body 1a and a vacuum pump 4. FIG. 1 illustrates, by way of example, the case of using a turbo-molecular pump as the vacuum pump 4. However, the vacuum pump 4 is not limited to the turbo-molecular pump, and various vacuum pumps can be used.

The valve main body 1a includes a valve body 11 configured to adjust a valve conductance, a motor 12 configured to drive the valve body 11, and an encoder 13 configured to measure the opening degree θ of the valve body 11. An opening degree measurement value θr of the encoder 13 is input to the valve control device 1b and an estimation device 5. For example, process gas flows into the chamber 3 through a flow rate controller 32. The pressure of the chamber 3 is measured by a vacuum meter 31. A pressure measurement value Pg measured by the vacuum meter 31 is input to the valve control device 1b and the estimation device 5. Details of the estimation device 5 will be described later. Note that in the present embodiment, the estimation device 5 is provided independently of the APC valve 1, but may be provided in the valve control device 1b.

Figure 2:
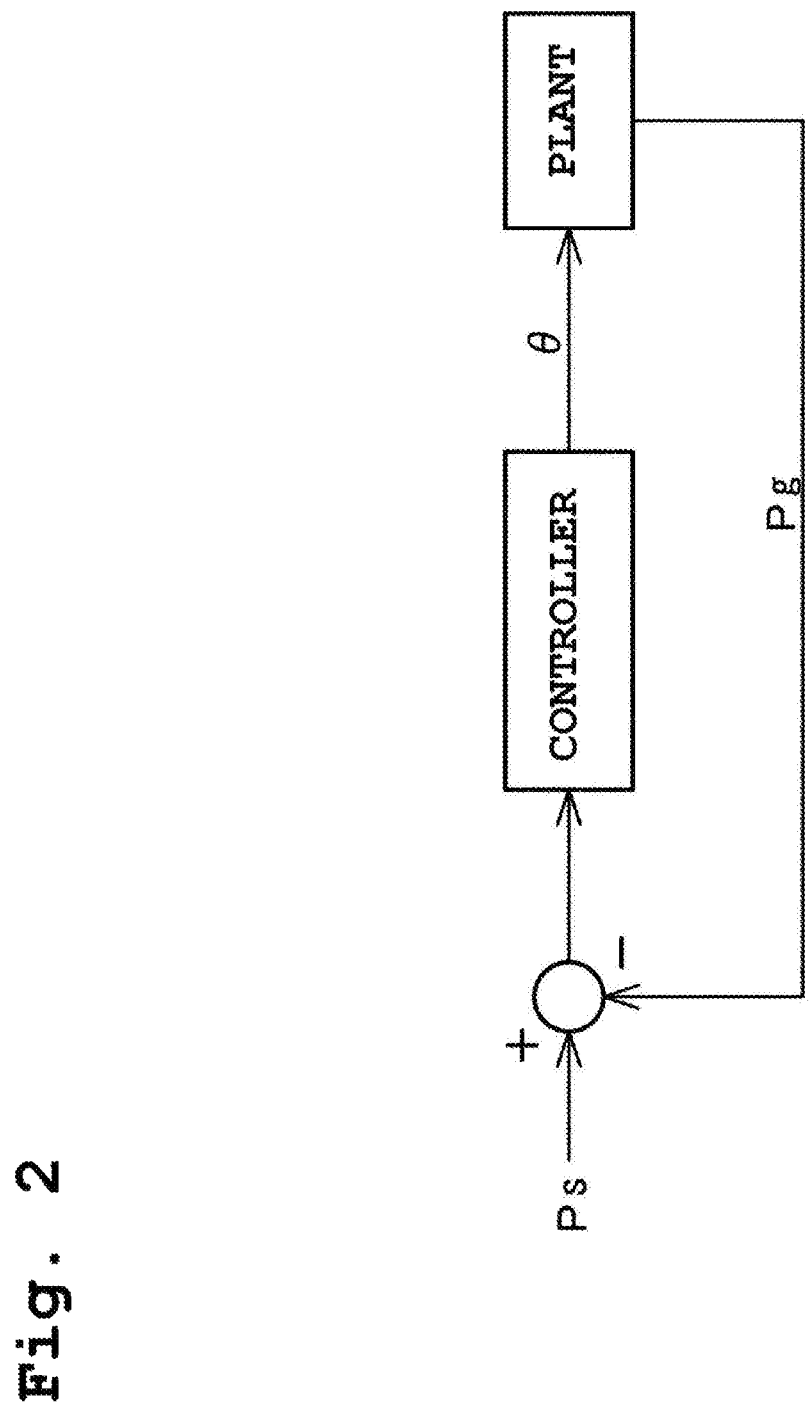
FIG. 2 is a diagram for describing a pressure adjustment control system of the APC valve.

FIG. 2 is a diagram for describing the outline of pressure adjustment control of the APC valve 1. A control system is divided into a control target (a plant) and a control section (a controller) as illustrated in FIG. 2. The chamber pressure as plant output is detected by the vacuum meter 31, and control is made such that such a signal (the pressure measurement value Pg) is fed back and reaches a predetermined pressure value (a pressure target value Ps) set as a target. Correspondence with the configuration of FIG. 1 will be described. The plant is a gas pumping section of the valve main body 1a taking the opening degree θ of the valve body 11 as input and taking the pressure measurement value Pg as output. The controller is an actuator section including the valve control device 1b and the motor 12 configured to drive the valve body 11. Controller input is a deviation between the pressure target value Ps and the pressure measurement value Pg, and controller output is the opening degree θ and is detected by the encoder 13.

Returning to FIG. 1, the valve control device 1b includes a pressure adjustment section 21, a motor drive section 22, a calibration section 23, and a storage section 24. The valve control device 1b is a computer and includes a CPU, ROM, RAM and/or electronic circuitry. The pressure adjustment section 21 inputs an opening degree signal θs for the pressure adjustment control to the motor drive section 22 based on the pressure measurement value Pg, the pressure target value Ps, and a control parameter necessary for pressure adjustment, such as the volume V of the chamber 3. The motor drive section 22 drives the motor 12 based on the opening degree signal θs.

For example, when a state of the pressure target value Ps=Ps0 changes to a state of an injected gas flow rate Qin and Ps=Ps1, the pressure adjustment section 21 generates, based on an expression for pumping as shown in Expression (1) below, such an opening degree signal θs that the pressure P of the chamber 3 approaches Ps1. After the pressure of the chamber 3 has reached close to Ps1, feedback control is performed such that the deviation of the pressure measurement value Pg from the pressure target value Ps reaches zero. In Expression (1), V is the volume of the chamber 3, and Se is an effective pumping speed determined by a chamber structure, the valve conductance, and the pumping speed of the vacuum pump 4.

$$Qin = V \times (dP/dt) + Se \times P \quad (1)$$

The control parameter necessary for the pressure adjustment control is stored in the storage section 24. Although a specific configuration of the control parameter will be described later, the control parameter depends on, e.g., the volume of the chamber 3 attached to the APC valve 1 and the type of gas to be pumped. Thus, for performing the pressure adjustment control with favorable accuracy, the control parameter needs to be acquired in a state in which the pumping system including the APC valve 1 and the vacuum pump 4 is attached to the chamber 3. The calibration section 23 performs the calibration processing of calibrating the control parameter stored in the storage section 24 to a control parameter adapting to an actual vacuum system.

As described later, in the calibration processing, the valve body 11 is actually driven to acquire necessary data (e.g., the pressure value) for every predetermined opening degree. For this reason, long time is necessary. Thus, the calibration processing is not frequently performed at a daily production step, but is performed with such a frequency that the calibration processing is performed upon regular maintenance. Thus, depending on process conditions, the mixture ratio of gas types, the flow rate, and the pressure are greatly different from those under conditions in calibration. As a result, optimal pressure adjustment performance cannot be delivered merely by typical calibration processing, and there is a probability that the performance remains in improper pressure adjustment performance leading, for example, to a state in which the pressure value becomes a vibrational response in the vicinity of a predetermined target pressure or is in a slightly overdamping state and needs long time until the predetermined target pressure.

For these reasons, in the present embodiment, the control parameter such as the effective pumping speed is estimated by the estimation device 5 illustrated in FIG. 1 upon the pressure adjustment control in the process, and such an estimation result is used for the pressure adjustment control in the valve control device 1b. In this manner, pressure control accuracy is improved. The estimation device 5 includes an estimation section 51, an oscillation section 52, and a detection section 53. The estimation device 5 is a computer and includes a CPU, ROM, RAM and/or electronic circuitry. Upon estimation of the control parameter, an oscillation signal with an oscillation amplitude Δθ is input from the oscillation section 52 of the estimation device 5 to the valve control device 1b. In this case, a signal obtained in such a manner that the oscillation signal with the oscillation amplitude Δθ is superimposed on the opening degree signal θs is output from the pressure adjustment section 21. The oscillation signal with the oscillation amplitude Δθ is an opening degree signal providing a micro vibration component (e.g., sine wave vibration or triangular wave vibration) to the valve body 11, and a pressure response corresponding to the oscillation amplitude Δθ is also generated at the detected pressure (the pressure measurement value Pg). The detection section 53 extracts, from the pressure measurement value Pg, the pressure response corresponding to the oscillation amplitude Δθ. The estimation section 51 estimates the control parameter based on the pressure response extracted by the detection section 53.

(Description of Control Parameter Estimation)

Figure 3:
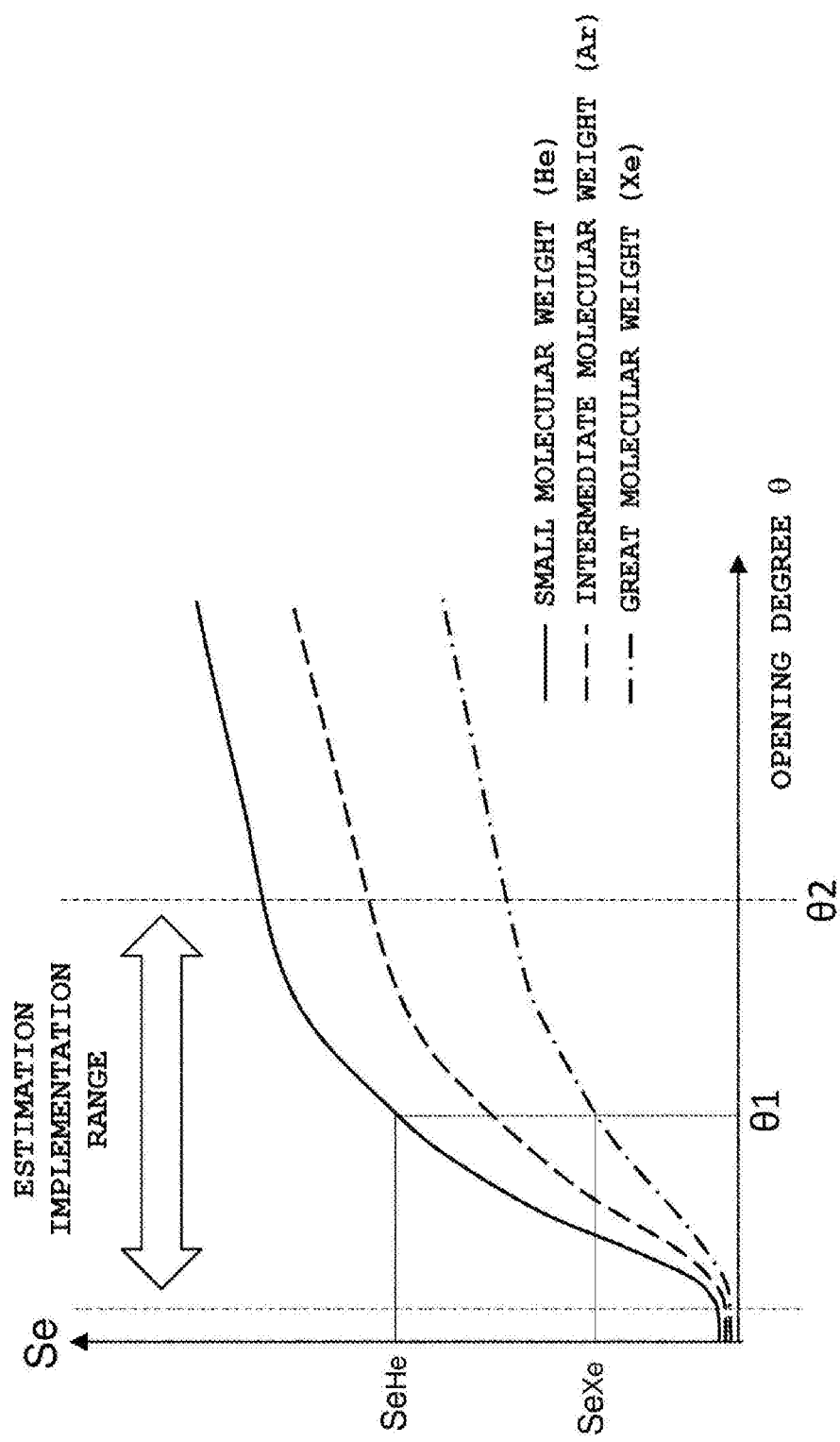
FIG. 3 is a graph of a relationship between an opening degree θ and an effective pumping speed Se.

Generally, a relationship Se(θ) between the opening degree θ of the valve body 11 and the effective pumping speed Se is a relationship shown by a monotonically-increasing curve illustrated in FIG. 3. The expression for pumping as shown in Expression (1) is linearized with an infinitesimal change amount in the vicinity of a certain equilibrium state 0. When infinitesimal change amounts for a chamber pressure P0, a flow rate Qin0, an effective pumping speed Se0, and an opening degree θ0 in the equilibrium state 0 are each ΔP, ΔQin, ΔSe, and Δθ, P=P0+ΔP, Qin=Qin0+ΔQin, Se=Se0+ΔSe, and θ=θ0+Δθ may be substituted into Expression (1) for pumping in the vicinity of the equilibrium state 0.

In the equilibrium state 0, Qin0=Se0×P0 and dP0/dt=0 are satisfied. Further, when ΔSe×ΔP is ignored as a secondary infinitesimal amount, the linearized pumping expression in the vicinity of the equilibrium state 0 turns into Expression (2) below. Further, the vicinity of the equilibrium state 0 can be represented by ΔSe=(∂Se/∂θ|0)×Δθ, and therefore, Expression (2) can be represented by Expression (3) below. Note that "∂Se/∂θ|0" represents ∂Se/∂θ in the equilibrium state 0.

$$Qin = V \times (dP/dt) + Se \times P \quad (1)$$

$$Qin0 + \Delta Qin = V \times (d(P0+\Delta P)/dt) + (Se0+\Delta Se) \times (P0+\Delta P)$$
$$\Delta Qin = V \times (d(\Delta P)/dt) + Se0 \times \Delta P + P0 \times \Delta Se \quad (2)$$

$$\Delta Qin = V \times (d(\Delta P)/dt) + Se0 \times \Delta P + P0 \times (\partial Se/\partial \theta|0) \times \Delta\theta \quad (3)$$

When Laplace transform is performed for Expression (3), Expression (3) is converted into d/dt→S (a complex variable of the Laplace transform), and therefore, the converted expression is represented by Expression (4) below. Note that in Expression (4), notation of each amount after the Laplace transform is the same as that before the transform.

$$\Delta P/P0 = \{\Delta Qin/P0 - (\partial Se/\partial \theta|0) \times \Delta\theta\}/(V \times S + Se0) \quad (4)$$

Expression (4) represents a relationship among the input ΔQin and Δθ and the pressure response (a pressure variable amplitude) ΔP. In the present embodiment, the pressure response (the pressure variable amplitude) ΔP for the input Δθ is focused, and in Expression (4), Expression (5) below taking ΔQin=0 is used. The superimposed oscillation signal (e.g., a sine wave signal) with the oscillation amplitude Δθ is an unusual signal form in a normal pressure adjustment process, and therefore, input of a disturbance signal similar to the oscillation signal to ΔQin is extremely rare, and therefore, it is not necessary to take ΔQin into consideration.

$$\Delta P/P0 = \{-(\partial Se/\partial \theta|0)/(V \times S + Se0)\} \times \Delta\theta \quad (5)$$

In Expression (5), "−(∂Se/∂θ|0)/(V×jω+Se0)" when S=jω is satisfied using an angular frequency ω and an imaginary number j is a transfer function upon observation taking Δθ as oscillation input and taking ΔP/P0 as output. The transfer function "−(∂Se/∂θ|0)/(V×jω+Se0)" includes the effective pumping speed Se, and therefore, an amplitude value and a phase value of the transfer function vary when the gas type and the flow rate vary in the case of the same opening degree. That is, the amplitude value and the phase value are stored in advance for each opening degree for reference gas, and actually-measured amplitude and phase values are compared with the phase value and the amplitude value for the reference gas so that the effective pumping speed Se can be estimated.

Hereinafter, the easily-handling cases of ω→0 and ω→+∞ will be considered.

(Case of ω→0)

In this case, a section of V×jω in the transfer function "−(∂Se/∂θ|0)/(V×jω+Se0)" is V×jω→0, and therefore, the limit value of the amplitude value of the transfer function is (∂Se/∂θ|0)/Se0. This is the same as a so-called plant gain Gp (see, e.g., JP-A-2018-112263). That is, it can be said that the transfer function Gp=(∂Se/∂θ|0)/Se0 obtained from the limit of ω→0 is a static plant gain and the transfer function "−(∂Se/∂θ|0)/(V×jω+Se0)" is a dynamic plant gain. It has been known that the static plant gain Gp(θ) shows a small difference among the gas types and the flow rates, and detection of such a difference is not easy.

(Case of ω→+∞)

Figure 4:
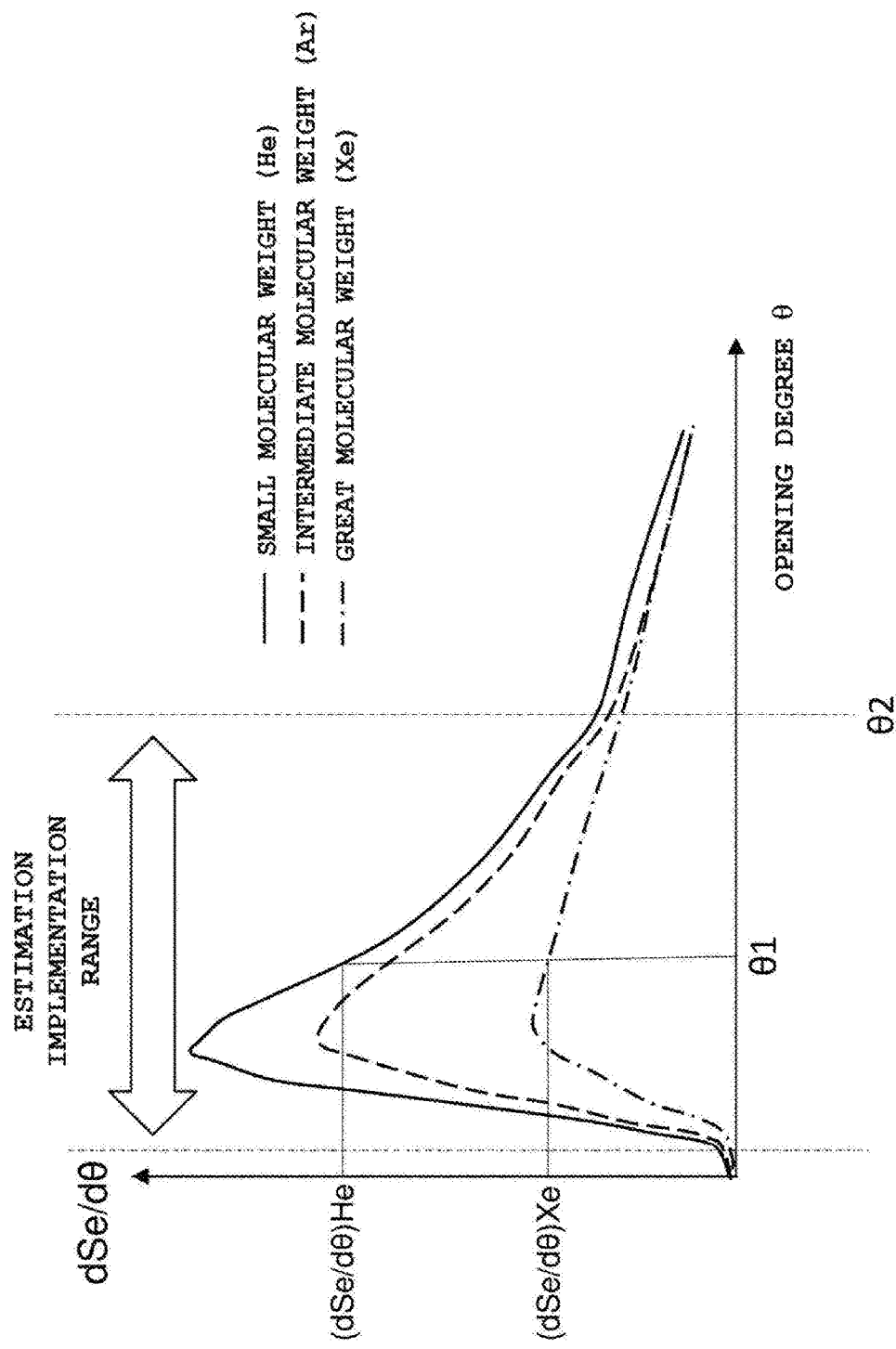
FIG. 4 is a graph of a relationship between the opening degree θ and an opening degree derivative value of the effective pumping speed Se.

In the case of ω→+∞, (V×ω)»Se0 is satisfied, and therefore, the limit value of the amplitude value is (∂Se/∂θ|0)/(Vω). As illustrated in FIG. 3, the effective pumping speed Se shows a great difference among gases. As illustrated in FIG. 4, an opening degree derivative value of the effective pumping speed Se shows a magnitude relationship correlating with the magnitude of an effective pumping speed value in other ranges than an opening degree range with an extremely-small θ and an opening degree range with an extremely-great θ. Thus, in a range (an estimation implementation range) indicated by an arrow in FIG. 4, the opening degree derivative value of the effective pumping speed Se notably shows a difference among gases, and estimation can be performed with favorable accuracy.

In the case of ω→+∞, when Expression (5) is rewritten to an expression regarding the amplitude value, the opening degree derivative value of the effective pumping speed Se in the equilibrium state 0 is represented by Expression (6) below. Thus, the oscillation signal with the oscillation amplitude Δθ is, with a relatively-high ω, provided to measure the pressure variable amplitude ΔP, and these values are substituted into Expression (6) so that the value of ∂Se/∂θ|0 can be acquired.

$$\partial Se/\partial \theta|0 = (\Delta P/P0) \times \omega \times V/\Delta\theta \quad (6)$$

Note that when ω is too high, the measured pressure amplitude decreases in reverse proportion to ω, and therefore, detection is difficult. Thus, detection may be made with ω slightly greater than the inverse of the time constant of gas (in an example illustrated in FIG. 3, helium gas) with a shortest time constant among target gases. For example, ω is set as in ω=(Se/V)×about several times. Se varies according to the opening degree θ, and therefore, Se is a rough value such as an average value. In the case of using, as Se, an effective pumping speed value Semax at the upper limit (an opening degree θ2) of the estimation implementation range illustrated in FIG. 3, ω may be set as in ω>Semax/V.

In the storage section 24 of the valve control device 1b, a data set indicating a relationship between an opening degree derivative value of a reference effective pumping speed and the opening degree is stored in advance. The estimation section 51 compares the reference data set with the above-described measurement data (the opening degree derivative value of the effective pumping speed) to estimate the effective pumping speed Se corresponding to pumped gas.

For example, a case where the reference data set stored in the storage section 24 is a data set regarding helium gas (He) and actually-pumped gas is xenon (Xe) is assumed. When it is assumed that the pressure variable amplitude ΔP by the oscillation signal with the oscillation amplitude Δθ is acquired at an opening degree θ1 of FIG. 4, Δθ and ΔP are substituted into Expression (6) to obtain the opening degree derivative value (described herein as (∂Se/∂θ)Xe) of the effective pumping speed of the xenon gas. The opening degree derivative value of the effective pumping speed of the helium gas at the opening degree θ1 is (∂Se/∂θ)He.

The static plant gain $Gp=(\partial Se/\partial\theta)/Se$ shows a small difference due to a gas type difference as described above. When it is assumed that the plant gain GpHe of the helium gas and the plant gain GpXe of the xenon gas are equal to each other, a relationship represented by Expression (7) below is satisfied between $\partial Se/\partial\theta$ and the effective pumping speed Se. That is, the ratio of the opening degree derivative value of the effective pumping speed and the ratio of the effective pumping speed can be assumed as substantially equal.

$$(\partial Se/\partial\theta)Xe/(\partial Se/\partial\theta)He = SeXe/SeHe \quad (7)$$

Thus, the estimation section 51 calculates a ratio between the acquired data $(\partial Se/\partial\theta)Xe$ and the reference gas data $(\partial Se/\partial\theta)He$, and multiplies the effective pumping speed SeHe of the reference gas by the calculated ratio to calculate an actual effective pumping speed SeXe. The calculation result (SeXe) is transmitted to the valve control device 1b, and is used for the pressure adjustment control by the pressure adjustment section 21. In this case, it is assumed that the data $(\partial Se/\partial\theta)He$ and SeHe regarding the reference gas (He) are stored in the storage section 24.

In a case where the plant gain GpHe is stored as the data on the reference gas (He) in the storage section 24, a relationship of GpHe≈GpXe is satisfied, and therefore, the actual effective pumping speed (the effective pumping speed for the xenon gas) can be directly calculated from the data on the plant gain GpHe and Expression (6). As described above, $Gp=(\partial Se/\partial\theta)/Se$ is satisfied, and therefore, Expression (6) can be modified into Expression (8) below. The angular frequency ω and the oscillation amplitude Δθ regarding oscillation, the measured pressure variable amplitude ΔP, and the pressure measurement value Pg are substituted into Expression (8), and in this manner, the actual effective pumping speed Se (=SeXe) at the opening degree θ1 is obtained.

$$Se=(\Delta P/Pg)\times\omega\times V/(Gp\times\Delta\theta) \quad (8)$$

Meanwhile, the plant gain Gp also relates to the oscillation amplitude Δθ and the pressure variable amplitude ΔP, and can be also represented by Expression (9) below. Note that |(ΔP/Δθ)| represents an absolute value of (ΔP/Δθ).

$$Gp=|dP/d\theta|/P \quad (9)$$

Figure 5:
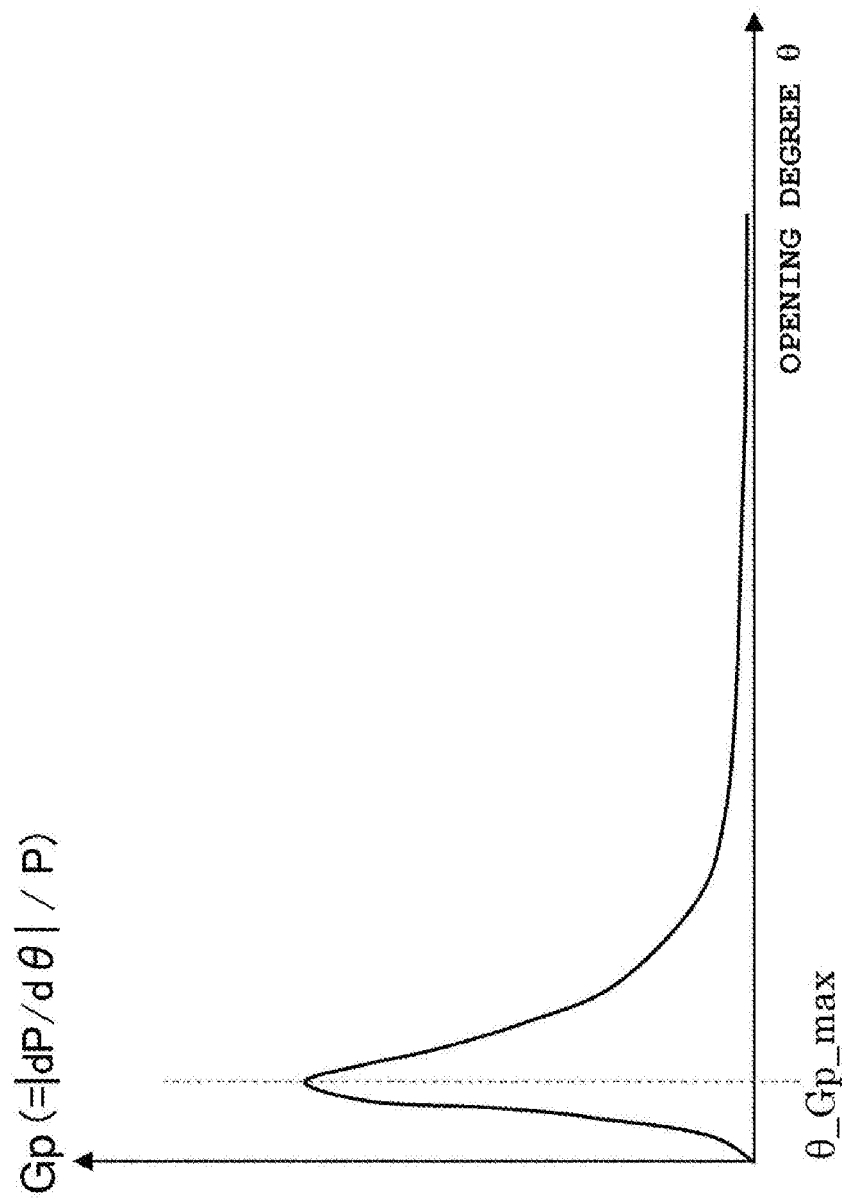
FIG. 5 is a graph of a relationship between the opening degree θ and a plant gain Gp.

As illustrated in FIG. 5, it has been known that the plant gain Gp(θ) takes the maximum value in a small opening degree range. In FIG. 5, the opening degree with the maximum plant gain Gp(θ) is described as θ_Gp_max. As described above, the pressure amplitude is high at θ_Gp_max, and therefore, the Δθ value is set in reverse proportion to Gp sensitivity so that a stable pressure amplitude can be obtained regardless of the opening degree. That is, the oscillation amplitude Δθ is set such that the value of (Gp(θ)×Δθ) is constant. In this manner, the measured pressure amplitude value ΔP is approximately at the same level, and therefore, it is rational in terms of measurement accuracy.

Specific Example of Oscillation Conditions

Next, oscillation conditions will be described using specific numerical values. The control parameter regarding the reference gas is stored in the storage section 24, but process gas to be actually injected into the chamber 3 is generally different from the reference gas. A case where the reference gas is helium gas and the gas to be actually applied is xenon gas will be described herein. In a case where the flow rate Qin of gas to be injected into the chamber 3 is about 100 [sccm], the valve body 11 is controlled in a relatively-small opening degree range.

For the effective pumping speed Se of the pumping system including the APC valve 1 and the vacuum pump 4, the conductance of the APC valve 1 is dominant in a range with a small valve body opening degree. When a gas molecular weight is M, the conductance of the APC valve 1 is proportional to $1/\sqrt{M}$, and therefore, in the range in which the conductance is dominant, the effective pumping speed Se is also substantially proportional to $1/\sqrt{M}$. The molecular weight of the helium gas is 4, and the molecular weight of the xenon gas is 131. Thus, the effective pumping speed SeHe for the helium gas is about six times as high as the effective pumping speed SeXe for the xenon gas. On the other hand, in a range with a great valve opening degree, the pumping speed of the vacuum pump 4 is dominant, and therefore, the effective pumping speed ratio SeHe/SeXe is substantially equal to the ratio SpHe/SpXe of the pumping speed Sp of the vacuum pump 4. For the sake of simplicity in description, it is assumed that the effective pumping speed ratio SeHe/SeXe substantially similarly maintains the six-fold relationship even in the range with the great valve opening degree.

Note that in a case where a gas mixture containing multiple types of gas is injected as the process gas, the average of the molecular weights of the gases contained in the gas mixture is used.

In this case, the effective pumping speed SeHe of the reference gas from the minimum opening degree to the maximum opening degree is 30 [L/s] to 3000 [L/s], and the volume V of the chamber 3 acquired upon calibration is V=100 [L]. As described above, in a case where the angular frequency ω in oscillation is set to ω=(Se/V)×about several times, the time constant V/Se is shorter in the helium gas than in the xenon gas, and therefore, the upper limit of the angular frequency ω is determined by the time constant of the helium gas. That is, SeHe is 30 [L/s] to 3000 [L/s], and therefore, SeHe/V=0.3 to 30 [rad/s] is satisfied. When the angular frequency ω in oscillation is set to twice as much as SeHe/V, ω=0.6 to 60 [rad/s] is satisfied.

Further, when the value of $(\partial Se/\partial\theta)He$ is 3 to 300 [L/(s·%)], the amplitude value "$(\partial Se/\partial\theta)He/(V\times\omega)$" of the transfer function is $(\partial Se/\partial\theta)He/(V\times\omega)=(3 \text{ to } 300)/(100\times(0.6 \text{ to } 60))=1/(20 \text{ to } 2000)$. Generally, when an error of convergence to the pressure target value Ps is within ±1% (equal to or smaller than 1/100), it may be often taken as completion of pressure adjustment. Thus, when an adverse effect of pressure fluctuation of ΔP/P0 on pressure adjustment can be fully ignored (smaller than the convergence error) and pressure fluctuation is 0.1% as a value indicating that pressure fluctuation is observable, 0.001=ΔP/P0=Δθ/(20 to 2000) is satisfied. For satisfying these conditions, Δθ=0.02 to 2% (in the case of Xe, a range of a value of 1/6) is satisfied, and it is understood that oscillation of the valve body 11 is allowed even by a normal drive mechanism.

In the case of severe pressure adjustment conditions and severe system vibration conditions, such as a case where a strict acceptable convergence error is set and a resonance point of a structure is present in the vicinity of an oscillation frequency, oscillation is not necessarily performed until completion of pressure adjustment, but detection can be made only by oscillation for a short period of time at timing at which pressure fluctuation is small, such as the point of starting a pressure adjustment event. In the case of ω=60 [rad/s], a single cycle is about 100 ms, and therefore, oscillation across several cycles (e.g., about two cycles (200 ms)) may be performed. Even in a case where in the pressure adjustment process, a response is slower than the frequency ω in oscillation and pressure fluctuation is great, detection can be made by extraction of a ω component by a filter.

As described above, in the present embodiment, ∂Se/∂θ can be estimated during gas pumping. Thus, ∂Se/∂θ can be also estimated during the calibration processing, and such an estimation result can be utilized for determination on whether or not the calibration processing is properly performed. First, the calibration processing will be described, and the method for utilizing the estimation result in the calibration processing will be subsequently described.

(Calibration Processing)

Figure 11:
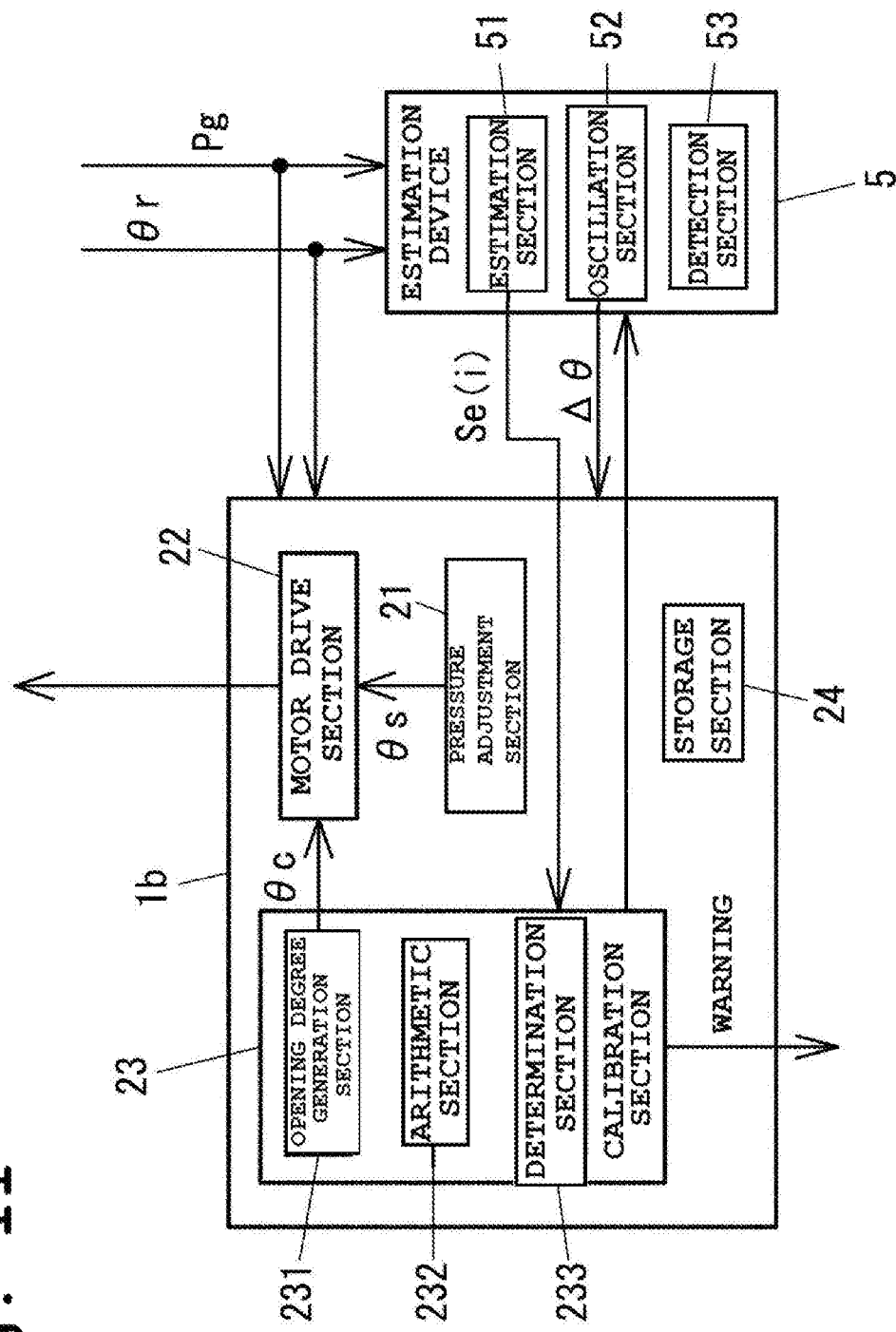
FIG. 11 is a block diagram of details of a calibration section.

FIG. 11 is a block diagram of details of the calibration section 23. The calibration section 23 includes an opening degree generation section 231, an arithmetic section 232, and a determination section 233. The calibration section 23 is a computer and includes a CPU, ROM, RAM and/or electronic circuitry. The opening degree generation section 231 outputs an opening degree signal θc for calibration to the motor drive section 22. The arithmetic section 232 acquires opening degree-pressure characteristics from the pressure measurement value Pg obtained upon opening/closing control using the opening degree signal θc, thereby calculating the effective pumping speed Se (θ), opening degree-plant gain characteristics, and the volume V of the chamber 3. The determination section 233 performs determination regarding the gas type and flow rate of gas injected into the chamber 3. Note that in the present embodiment, the calibration section 23 configured to perform the calibration processing is provided at the valve control device 1b of the APC valve 1, but is not necessarily provided in the APC valve 1 and may be provided as an independent calibration device.

Figure 6:
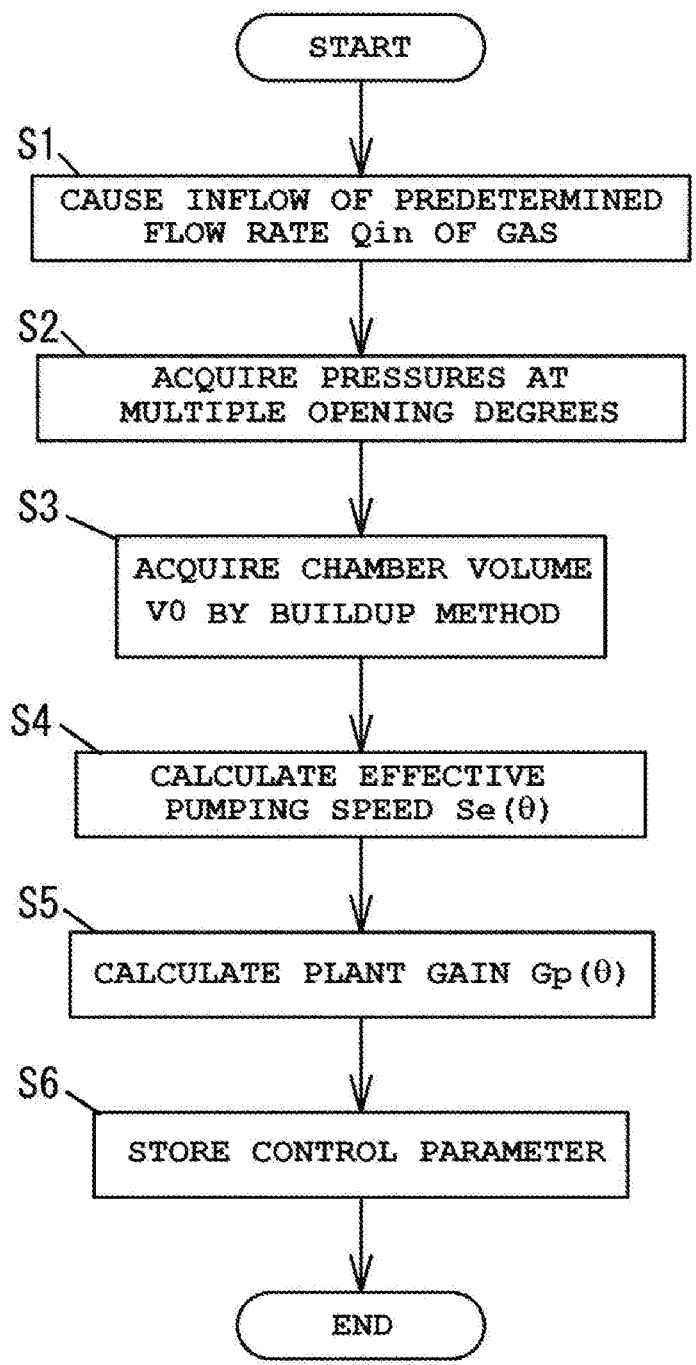
FIG. 6 is a flowchart of one example of calibration processing.
Figure 7:
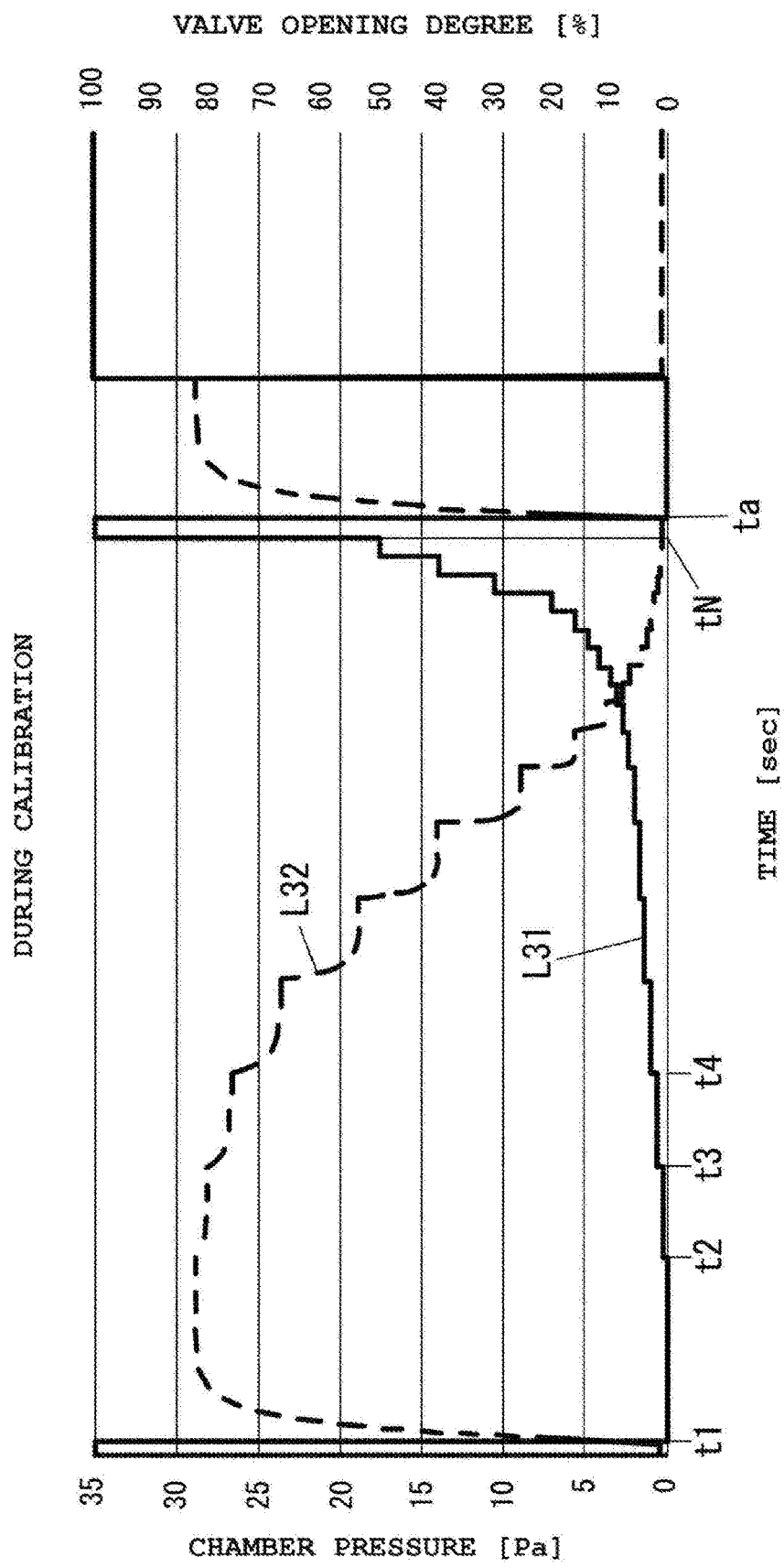
FIG. 7 is a graph of the opening degree θ and a chamber internal pressure upon the calibration processing.

FIG. 6 is a flowchart of one example of the calibration processing executed by the calibration section 23 of the valve control device 1b. Moreover, FIG. 7 is a graph of the opening degree θ and a chamber internal pressure in the calibration processing. In FIG. 7, a line L31 represents the opening degree measurement value θr (%), and a line L32 represents the pressure measurement value Pg (Pa) measured by the vacuum meter 31.

At a step S1 of FIG. 6, the predetermined flow rate Qin of gas of a specified gas type flows into the chamber 3 from the flow rate controller 32. Then, the processing stands by until the pressure measurement value Pg is stabilized. The gas type and the predetermined flow rate Qin in the calibration processing are, for example, set according to a manual of the APC valve 1, and according to description of the manual, an operator causes the predetermined flow rate Qin of predetermined gas to flow into the chamber 3.

At a step S2, the processing of acquiring pressures for multiple opening degree measurement values θr(i) is performed. Note that i=1 to N (a positive integer). In the calibration processing, the opening degree signal θc for calibration is, according to an instruction of the calibration section 23, input from the opening degree generation section 231 to the motor drive section 22. In an example illustrated in FIG. 7, the opening degree signal θc changes from 100% to 0% at a time point t1 at which θr=100% is satisfied and the pressure measurement value Pg is stabilized.

The pressure measurement value Pg increases due to a change in the opening degree, and when the pressure measurement value Pg is stabilized and reaches a substantially constant value, a pressure measurement value Pg(1) of the vacuum meter 31 is acquired. Similarly, the opening degree signals θc(2), θc(3), . . . , θc(N) are output in this order at time points t2, t3, . . . , tN of FIG. 7, and pressure measurement values Pg(2), Pg(3), . . . , Pg(N) are acquired for multiple opening degree measurement values θr(2), θr(3), . . . , θr(N)=100%.

At a step S3, the volume V of the chamber 3 is obtained by a buildup method. Specifically, at a time point ta of FIG. 7, the opening degree signal θc changes from 100% to 0%, and accordingly, multiple pressure measurement values Pg after change are acquired. Since the opening degree is 0%, a relationship of Expression (10) below is satisfied among the pressure P, the gas inflow amount Qin, and the volume V of the chamber 3. Thus, the volume V of the chamber 3 can be calculated from a change in the pressure measurement value Pg measured after the time point ta.

$$Qin=V\times(dP/dt) \quad (10)$$

Figure 8:
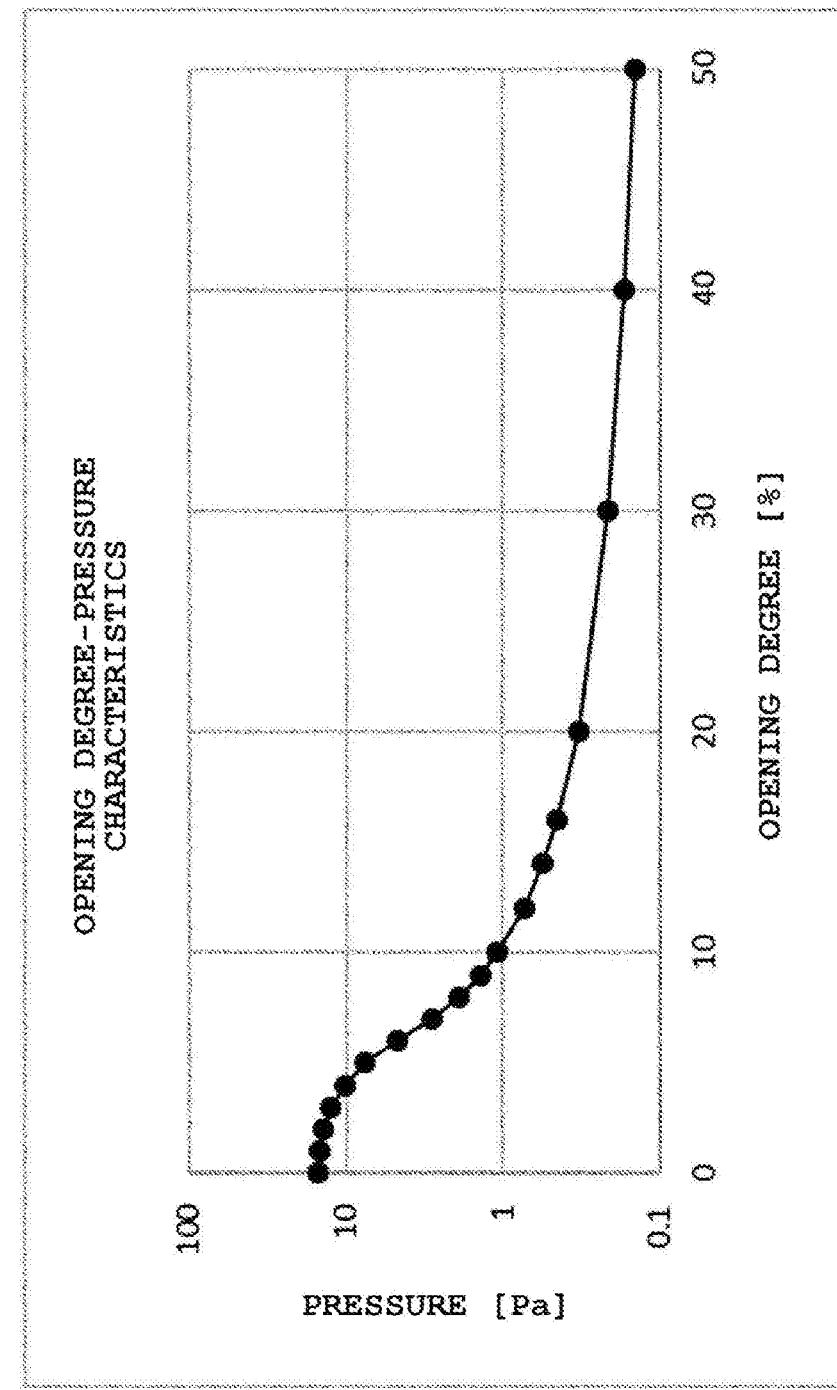
FIG. 8 is a graph of opening degree-pressure characteristics.
Figure 9:
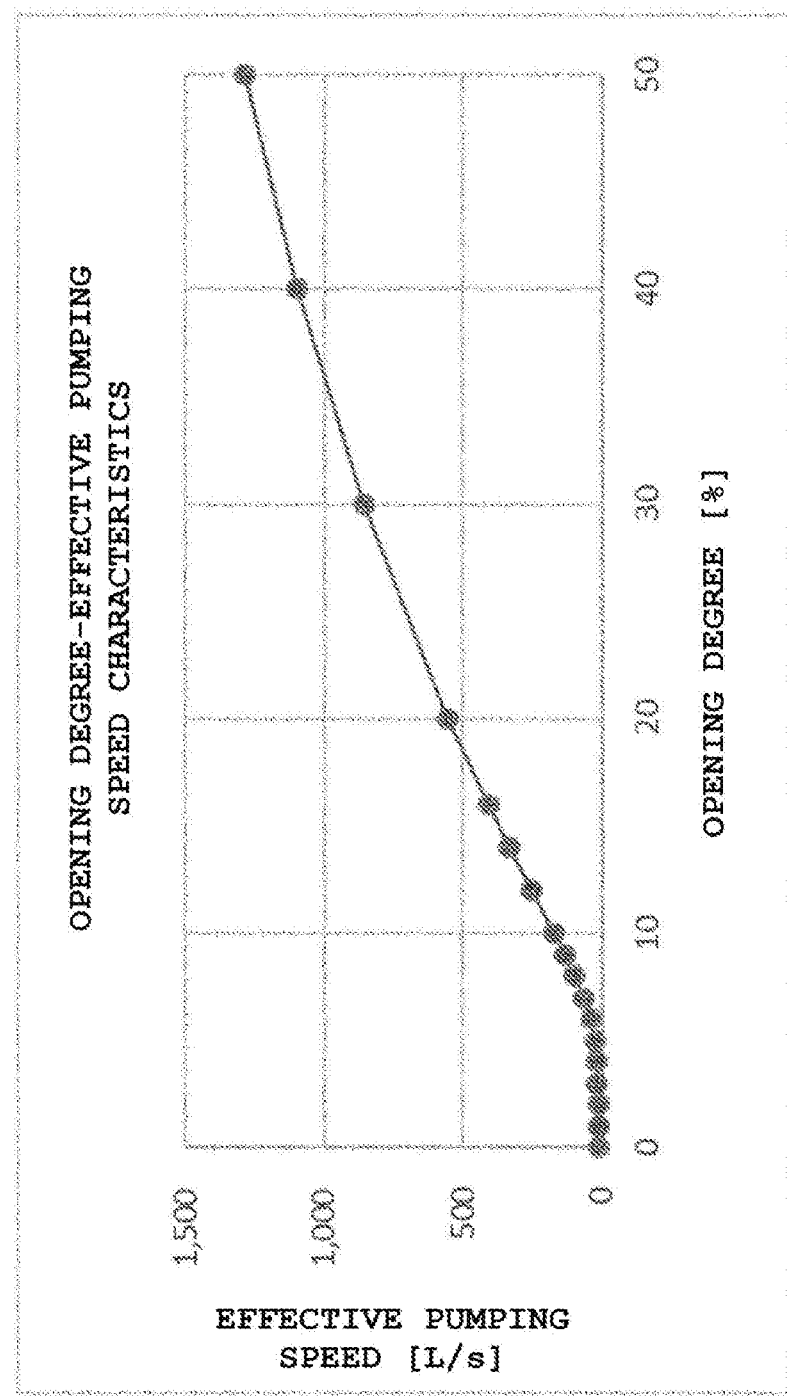
FIG. 9 is a graph of opening degree-pumping speed characteristics.

At a step S4, the effective pumping speed Se(θ) at the opening degree θ of the APC valve 1 is calculated. Based on the flow rate value Qin of gas flowing into the chamber 3 and the pressure measurement values Pg(2) to Pg(N) at the opening degrees θr(1) to θr(N) as acquired at the step S2, the opening degree-pressure characteristics (i.e., P(θ)) illustrated in FIG. 8 is obtained. The effective pumping speed Se(θ) satisfies a relationship of Expression (11) below in the equilibrium state. Opening degree-effective pumping speed characteristics (i.e., Se(θ)) illustrated in FIG. 9 are obtained from the opening degree-pressure characteristics (i.e., P(θ)) illustrated in FIG. 8 and Expression (11).

$$Se(\theta)=Qin/P(\theta) \quad (11)$$

Figure 10:
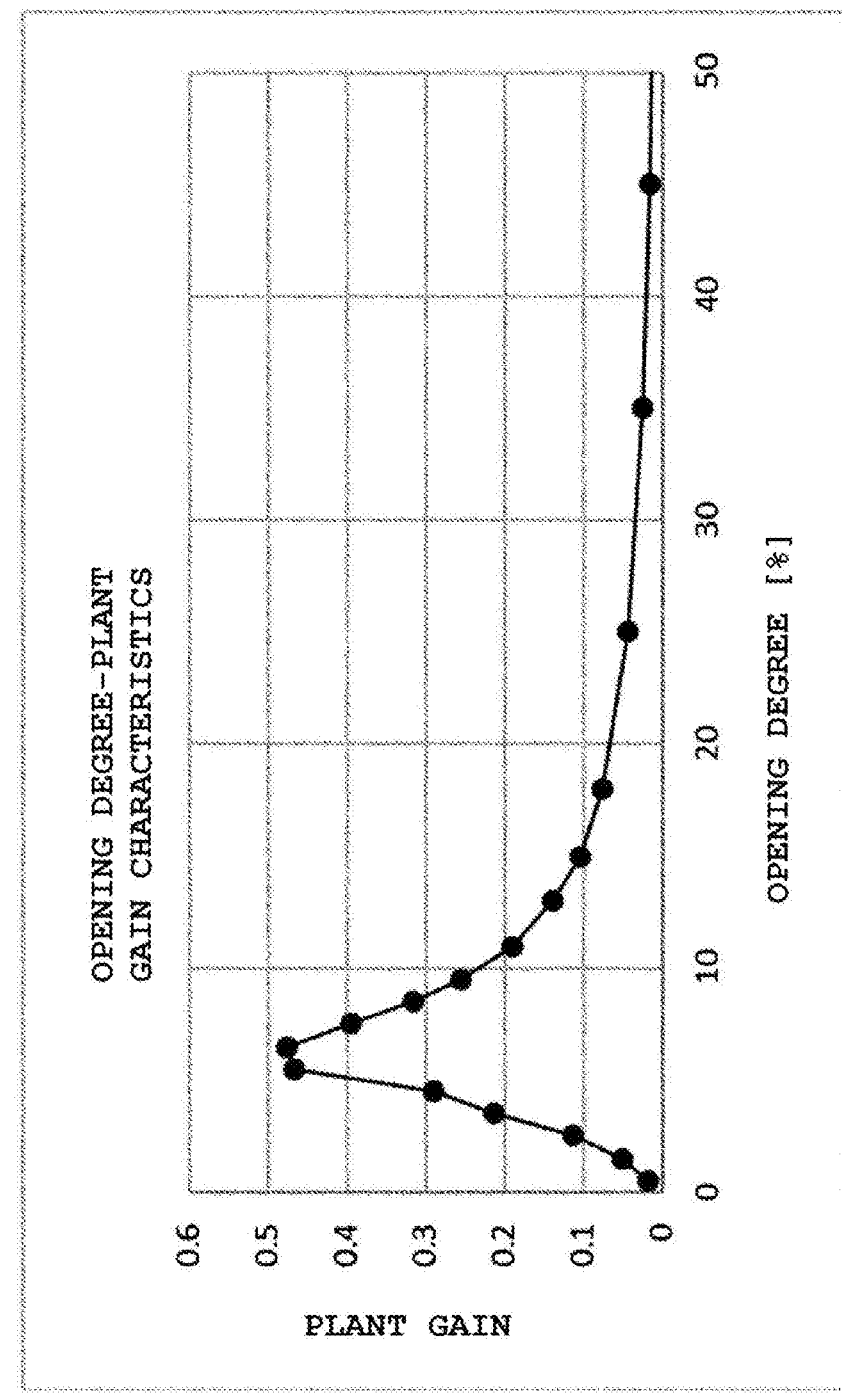
FIG. 10 is a graph of opening degree-plant gain characteristics.

At a step S5, the plant gain Gp(θ) is calculated from the opening degree-pressure characteristics illustrated in FIG. 8 and Expression (9). As a result, the opening degree-plant gain characteristics illustrated in FIG. 10 are obtained. At a step S6, the control parameter, i.e., the volume V of the chamber 3, acquired by the calibration processing, the opening degree-effective pumping speed characteristics (Se (θ)), and the opening degree-plant gain characteristics (Gp (θ)) are stored in the storage section 24 of the APC valve 1. In a case where the control parameter is stored in advance in the storage section 24, such a control parameter is corrected using the control parameter acquired by the calibration processing, or is directly re-written.

(Utilization of Estimation Result in Calibration Processing)

For enhancing the accuracy of the calibration processing, the flow rate Qin specified as described above needs to be injected into the chamber 3, and the gas of the specified gas type preferably flows into the chamber 3. With this configuration, calibration of the chamber volume V and the effective pumping speed Se can be performed with favorable accuracy. Hereinafter, the oscillation signal with the oscillation amplitude Δθ is provided to the opening degree signal to acquire the pressure variable amplitude ΔP, and in this manner, the gas type (the gas molecular weight) and flow rate of calibration gas are estimated by the estimation device 5. The determination section 233 of the calibration section 23 determines, based on such an estimation result, whether or not a proper flow rate of proper gas is injected, and provides such a determination result to the operator. As a result, improper calibration processing can be prevented.

As illustrated in FIG. 11, the determination section 233 configured to perform determination regarding the gas type and the flow rate is provided at the calibration section 23. Upon determination, the calibration section 23 requests output of the oscillation signal with the oscillation amplitude Δθ, and causes the estimation device 5 to estimate the effective pumping speed Se. Based on the effective pumping speed Se estimated by the estimation device 5, the determination section 233 determines whether or not the gas type and flow rate of gas injected into the chamber 3 are the gas type and the flow rate set according to the manual.

In the calibration processing illustrated in FIG. 6, the pressures at the multiple opening degree measurement values θr(i) are acquired at the step S2, and upon acquisition of these pressures, the oscillation signal with the oscillation amplitude Δθ is provided to cause the estimation device 5 to estimate the effective pumping speed. For example, after the pressure measurement value Pg(i) for the opening degree measurement value θr(i) has been acquired, the oscillation signal is output from the oscillation section 52 for predetermined time, and the opening degree derivative value of the effective pumping speed is calculated based on the oscillation amplitude Δθi and the measured pressure variable amplitude ΔPi. The opening degree is changed to the opening degree measurement value θr(i+1) after calculation, and the pressure measurement value Pg(i+1) and the opening degree derivative value of the effective pumping speed are similarly calculated. As a result, the opening degree derivative value of the effective pumping speed is acquired for each of the multiple opening degree measurement values θr(2), θr(3), . . . , θr(N). Estimation of the effective pumping speed may be performing at any timing of 1 to N.

It is, as a precondition of description, assumed that the control parameter (an effective pumping speed Se(θ)Ar) regarding argon gas is stored in the storage section 24 upon shipment of the APC valve 1. Moreover, it is assumed that the manual of the APC valve 1 describes that the gas type is set to argon gas and the flow rate is set to Qin as setting conditions upon calibration.

When an oscillation instruction is input from the calibration section 23, the estimation device 5 causes the oscillation section 52 to output the oscillation signal with the oscillation amplitude Δθ. The estimation section 51 of the estimation device 5 estimates the effective pumping speed Se. The pressure measurement value Pg(i) at the opening degree measurement value θr(i), the angular frequency ω in oscillation, the oscillation amplitude Δθi, and the pressure variable amplitude ΔPi are substituted into Expression (6) described above, and therefore, the opening degree derivative value (∂Se/∂θ)i of the effective pumping speed at the opening degree measurement value θr(i) is calculated as in Expression (12) below. As described above, for the opening degree measurement value θr(i), the pressure measurement value Pg(i) and the opening degree derivative value (∂Se/∂θ)i of the effective pumping speed are acquired.

$$(\partial Se/\partial \theta)i = (\Delta Pi/Pg(i)) \times \omega \times V/\Delta \theta i \qquad (12)$$

Further, the estimation section 51 reads the effective pumping speed Se(θi)Ar as the reference data stored in the storage section 24 of the valve control device 1b, and discretely calculates the opening degree derivative value (dSe/dθ)Ar(θi) at the opening degree θi. Then, according to Expression (13) below, the effective pumping speed Se(i) at the opening degree measurement value θr(i) upon acquisition of the data ΔPi is calculated. The calculated effective pumping speed Se(i) is output to the calibration section 23.

$$Se(i) = \{(\partial Se/\partial \theta)i/(dSe/d\theta)Ar(\theta i)\} \times Se(\theta i)Ar \qquad (13)$$

The determination section 233 of the calibration section 23 calculates the flow rate Qin(i) of gas injected into the chamber is calculated according to Expression (14) below based on the effective pumping speed Se(i) as actual measurement data. Further, the molecular weight Mi of the injected gas is calculated according to Expression (15).

$$Qin(i) = Se(i) \times Pg(i) \qquad (14)$$

$$Mi = MAr \times \{Se(\theta i)Ar/Se(i)\}^2 \qquad (15)$$

When the gas injected into the chamber 3 upon calibration is the argon gas as instructed in the manual, the molecular weight Mi calculated according to Expression (15) is a value substantially equal to the molecular weight MAr of the argon gas. In the small opening degree range in which the conductance of the valve is dominant, Mi=MAr is ideally satisfied, but due to, e.g., a detection error, a slightly-shifted value of Mi is calculated. When a difference between the molecular weight Mi calculated according to Expression (15) and the argon gas molecular weight MAr=40 is within an acceptable range, the determination section 233 determines that the injected calibration gas is the argon gas as in the manual, i.e., is coincident with the argon gas. When a difference between the flow rate Qin(i) calculated according to Expression (14) and the flow rate Qin set according to the manual is within an acceptable range, the determination section 233 determines that the flow rate is set as in the manual, i.e., is coincident with the flow rate of the manual.

On the other hand, in a case where the difference between the molecular weight Mi and the argon gas molecular weight MAr=40 falls outside the acceptable range and the difference between the flow rate Qin(i) and the flow rate Qin falls outside the acceptable range, the calibration section 23 outputs a warning to notify the operator of improper setting of the gas type and the flow rate.

According to the above-described embodiment, the following features and advantageous effects are obtained.

(1) The estimation device 5 illustrated in FIG. 1 includes the oscillation section 52 configured to superimpose the oscillation signal for oscillating the valve body 11 of the APC valve 1 provided between the vacuum pump 4 configured to pump gas from the chamber 3 and the chamber 3 on the opening degree signal θs for driving the valve body 11, and the estimation section 51 configured to estimate, based on the pressure response (e.g., the pressure variable amplitude ΔP) of the chamber internal pressure upon oscillation, the pumping characteristics regarding the gas pumped through the APC valve 1. The pumping characteristics include, for example, the effective pumping speed Se, the opening degree derivative value ∂Se/∂θ of the effective pumping speed, the plant gain Gp, and the gas molecular weight.

As a result, the pumping characteristics of actually-pumped gas, such as the effective pumping speed Se, can be acquired. Pressure adjustment by the APC valve 1 is performed using the effective pumping speed estimated by the estimation device 5. Thus, even in a case where the control parameter corresponding to the process gas is not prepared in advance, stability of the pressure adjustment response can be improved.

(2) Further, based on the oscillation amplitude Δθ of the oscillation signal, the pressure variable amplitude ΔP as the pressure response, and the plant gain Gp indicating the relationship between a change in the opening degree of the valve body 11 and a change in the chamber internal pressure, the effective pumping speed Se of the APC valve 1 regarding the gas pumped through the APC valve 1 may be estimated according to Expression (8).

(3) The oscillation amplitude Δθ is set such that the product (Gp(θ)×Δθ) of the plant gain Gp(θ) indicating the relationship between a change in the opening degree of the valve body 11 and a change in the chamber internal pressure and the oscillation amplitude $\Delta\theta$ of the oscillation signal is constant. Thus, the same level of stable pressure amplitude value $\Delta P$ can be obtained regardless of the opening degree.

(4) In a case where the oscillation signal with the oscillation amplitude $\Delta\theta$ is provided to acquire the pressure variable amplitude $\Delta P$, the oscillation signal with the oscillation amplitude $\Delta\theta$ is, with a relatively-high $\omega$, preferably provided to measure the pressure variable amplitude $\Delta P$. However, when $\omega$ is too high, the measured pressure amplitude decreases in reverse proportion to $\omega$, and detection becomes difficult. Thus, when the volume of the chamber 3 is V and the effective pumping speed at the upper opening degree limit $\theta 2$ of the estimated opening degree range (the estimation implementation range illustrated in FIG. 3) for the effective pumping speed is Semax, the angular frequency $\omega$ of the oscillation signal is preferably set as in $\omega$>Semax/V.

(5) The valve control device 1b includes the storage section 24 configured to store the effective pumping speed Se of the APC valve 1 attached to the chamber 3 and the chamber volume V, the pressure adjustment section 21 configured to generate the opening degree signal $\theta s$ of the valve body 11 of the APC valve 1 based on the effective pumping speed Se and the chamber volume V stored in the storage section 24, the calibration section 23 configured to calibrate the effective pumping speed Se and the chamber volume V stored in the storage section 24 based on the chamber internal pressure (the pressure measurement value Pg) in a case where the APC valve 1 attached to the chamber 3 into which the predetermined molecular weight and the predetermined flow rate Qin of gas is injected is controlled to multiple opening degrees, and the determination section 233 configured to determine, based on the effective pumping speed estimated by the estimation device 5, whether or not the molecular weight and flow rate of gas are coincident with the predetermined molecular weight and the predetermined flow rate.

The determination result of the determination section 233 is utilized so that it can be recognized whether or not the calibration processing performed with the calibration gas being injected into the chamber 3 is performed under accurate setting conditions (the gas type, the flow rate). Thus, calibration of the effective pumping speed Se and the chamber volume V stored in the storage section 24 can be performed with favorable accuracy, and the stability of the pressure adjustment response can be improved.

Various embodiments and variations have been described above, but the present invention is not limited to contents of these embodiments and variations. Other aspects conceivable within the scope of the technical idea of the present invention are also included in the scope of the present invention.

What is claimed is:

1. An estimation device comprising:
    an oscillation section configured to superimpose an oscillation signal for oscillating a valve body of a vacuum valve provided between a vacuum pump configured to pump gas from a chamber and the chamber on an opening degree signal for driving the valve body; and
    an estimation section configured to estimate, based on a pressure response of a chamber internal pressure upon oscillation, a pumping characteristic regarding the gas pumped through the vacuum valve.

2. The estimation device according to claim 1, wherein the estimation device
    estimates, based on an oscillation amplitude of the oscillation signal, the pressure response, and a plant gain indicating a relationship between a change in an opening degree of the valve body and a change in the chamber internal pressure, an effective pumping speed regarding the gas pumped through the vacuum valve.

3. The estimation device according to claim 1, wherein the oscillation section sets the oscillation amplitude such that a product of a plant gain indicating a relationship between a change in an opening degree of the valve body and a change in the chamber internal pressure and an oscillation amplitude of the oscillation signal is constant.

4. The estimation device according to claim 1, wherein the pumping characteristic is the effective pumping speed regarding the gas pumped through the vacuum valve, and
    in a case where a volume of the chamber is V and an effective pumping speed at an upper opening degree limit of an estimated opening degree range for the effective pumping speed is Semax, the oscillation section sets an angular frequency $\omega$ of the oscillation signal to $\omega$>Semax/V.

5. A valve control device comprising:
    a pressure adjustment section configured to generate an opening degree signal of a valve body of a vacuum valve,
    wherein the pressure adjustment section generates the opening degree signal based on the pumping characteristic estimated by the estimation device according to claim 1.

6. A valve control device comprising:
    a storage section configured to store an effective pumping speed regarding gas pumped through a vacuum valve attached to a chamber and a chamber volume;
    a pressure adjustment section configured to generate an opening degree signal of a valve body of the vacuum valve based on the effective pumping speed and the chamber volume stored in the storage section;
    a calibration section configured to calibrate the effective pumping speed and the chamber volume stored in the storage section based on a chamber internal pressure in a case where the vacuum valve attached to the chamber into which a predetermined molecular weight and a predetermined flow rate of gas is injected is controlled to multiple opening degrees; and
    a determination section configured to determine, based on the pumping characteristic estimated by the estimation device according to claim 1, whether or not a molecular weight and a flow rate of the gas are coincident with the predetermined molecular weight and the predetermined flow rate.

* * * * *